US006399678B2

(12) United States Patent
Frankoski et al.

(10) Patent No.: US 6,399,678 B2
(45) Date of Patent: *Jun. 4, 2002

(54) SILICONE-AGGREGATE MIXTURES FOR PUMPING AND SPRAYING APPLICATIONS

(75) Inventors: Stanley Peter Frankoski, Joplin, MO (US); Mark Thomas Hensley, Galena, KS (US)

(73) Assignee: Tamko Roofing Products, Joplin, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,315

(22) Filed: Oct. 6, 1999

Related U.S. Application Data

(63) Continuation-in-part of application No. 09/104,499, filed on Jun. 25, 1998, now Pat. No. 6,027,038.

(51) Int. Cl.[7] .................................................. C08K 3/36
(52) U.S. Cl. ............................................ 524/3; 524/588
(58) Field of Search ...................................... 524/3, 588

(56) References Cited

U.S. PATENT DOCUMENTS

| | | | | | |
|---|---|---|---|---|---|
| 2,087,679 | A | | 7/1937 | Ball et al. | 83/73 |
| 2,606,645 | A | | 8/1952 | Heine | 198/64 |
| 2,934,464 | A | * | 4/1960 | Hoffman et al. | 154/43 |
| 3,035,016 | A | * | 5/1962 | Bruner | 260/46.5 |
| 3,451,833 | A | * | 6/1969 | Bonitz et al. | 524/3 |
| 3,661,817 | A | * | 5/1972 | Hamilton et al. | 524/3 |
| 3,676,170 | A | | 7/1972 | Kempthorne | 117/16 |
| 3,701,753 | A | * | 10/1972 | Shaw | 260/9 R |
| 3,957,714 | A | * | 5/1976 | Clark et al. | 260/33.6 SB |
| D245,006 | S | | 7/1977 | Mills | D15/19 |
| 4,046,357 | A | | 9/1977 | Twitchell | 259/147 |
| 4,231,917 | A | * | 11/1980 | Zeldin et al. | 524/3 |
| 4,297,265 | A | * | 10/1981 | Olsen | 260/33.6 SB |
| 4,389,439 | A | | 6/1983 | Clark et al. | 428/36 |
| 4,421,581 | A | | 12/1983 | Olsen | 156/71 |
| 4,474,217 | A | | 10/1984 | DeMarse et al. | 138/137 |
| D278,150 | S | | 3/1985 | Burenga | D15/19 |
| D316,100 | S | | 4/1991 | Kief | D15/19 |
| D322,972 | S | | 1/1992 | St. Ama | D15/19 |
| 5,240,760 | A | | 8/1993 | George et al. | 428/145 |
| 5,261,744 | A | | 11/1993 | Brunn | 366/217 |
| 5,338,783 | A | * | 8/1994 | Olsen | 524/3 |
| 5,512,615 | A | * | 4/1996 | Olsen | 524/3 |
| 5,522,677 | A | | 6/1996 | Schlecht | 405/150.2 |
| 5,660,465 | A | | 8/1997 | Mason | 366/3 |
| 5,827,587 | A | | 10/1998 | Fukushi | 428/36.6 |
| 6,245,142 | B1 | * | 6/2001 | Reddy et al. | 106/724 |

FOREIGN PATENT DOCUMENTS

GB 1258391 12/1971

* cited by examiner

*Primary Examiner*—Margaret G. Moore
(74) *Attorney, Agent, or Firm*—Sidley Austin Brown & Wood LLP

(57) ABSTRACT

A composition of matter, apparatus, and method relating to silicone-aggregate mixtures for pumping and spraying applications. Such mixtures include a solvent, a silicone or mixtures of silicones, a flow enhancing filler and aggregates.

14 Claims, 7 Drawing Sheets

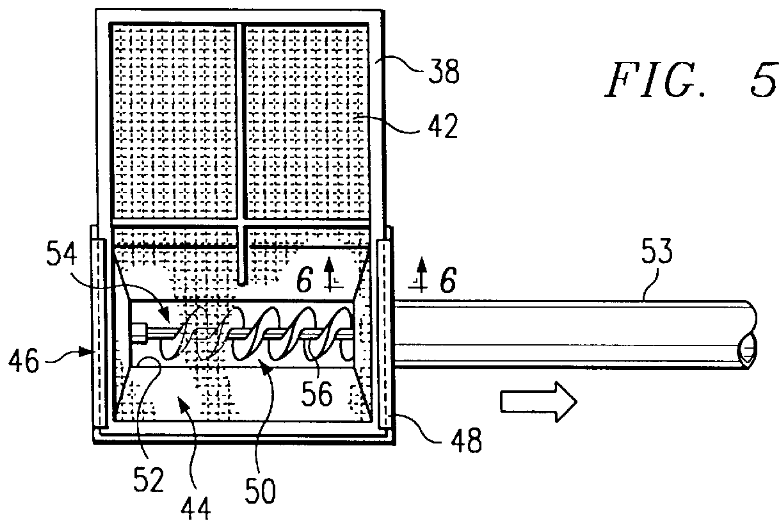
FIG. 5
FIG. 6
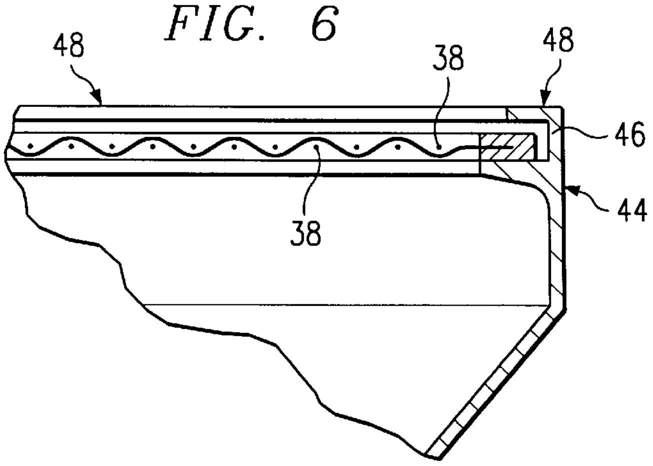
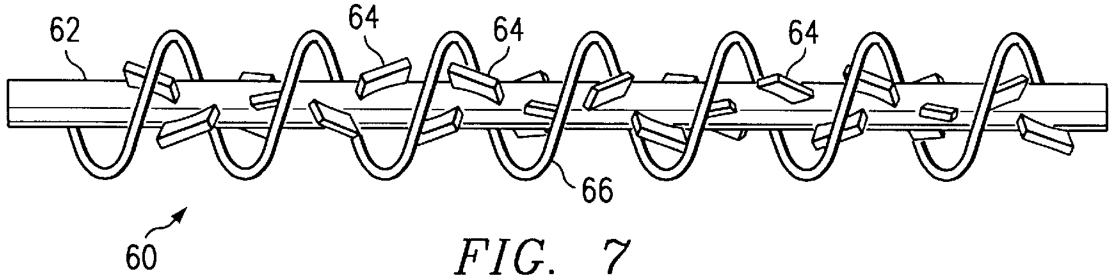
FIG. 7

FIG. 8
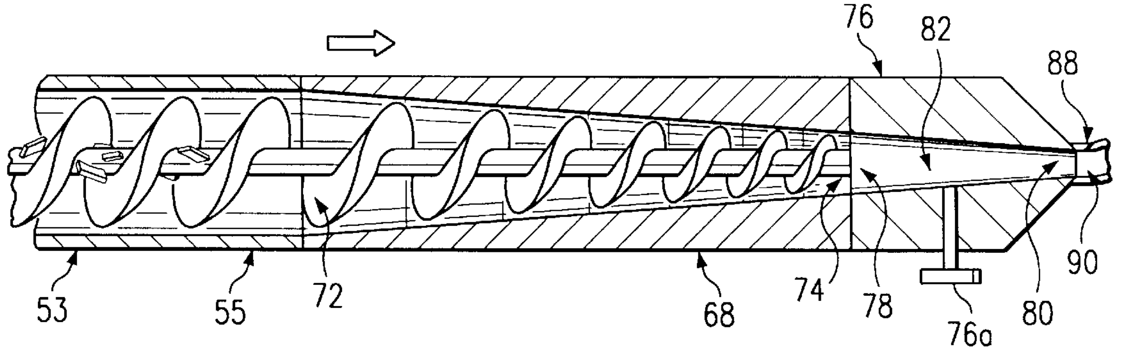
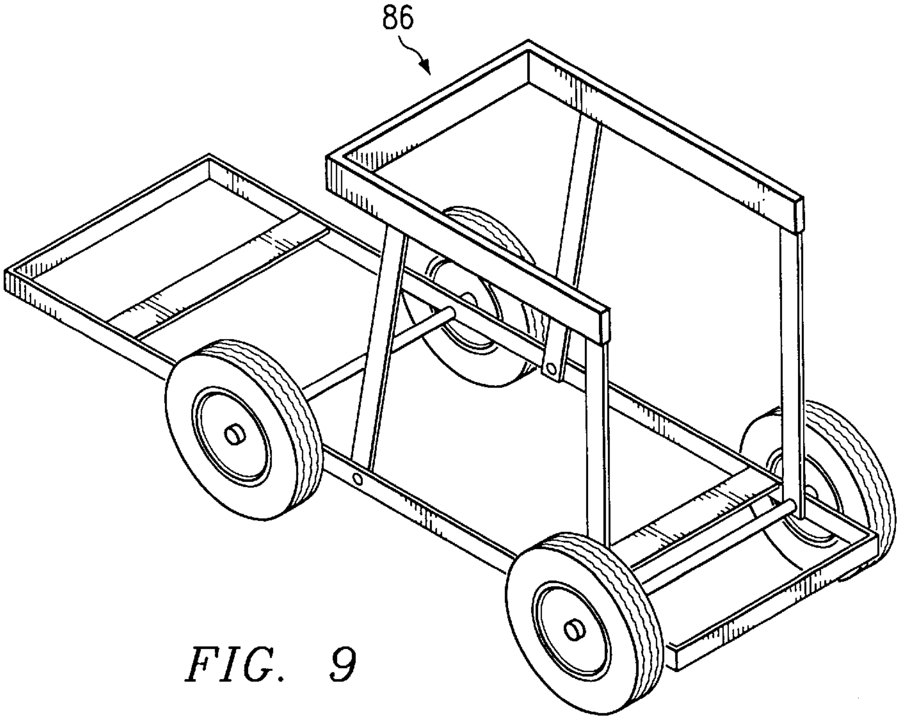
FIG. 9

SILICONE-AGGREGATE MIXTURES FOR PUMPING AND SPRAYING APPLICATIONS

This is a continuation-in-part of U.S. patent application Ser. No. 09/104,499 filed on Jun. 25, 1998, now U.S. Pat. No. 6,027,038.

FIELD OF THE INVENTION

This invention relates generally to the field of silicone-aggregate mixtures for pumping and spraying applications.

BACKGROUND OF THE INVENTION

Silicone rubber compositions have been used for a variety of applications in the past. Silicone rubber is desirable because it is waterproof, it is generally unaffected by wide temperature variations, and it resists the deteriorating effects of acids, bases, salts and ultraviolet (UV) radiation. Furthermore, silicone rubber is flame retardant and thus is suitable for applications requiring increased protection from fire. The flame retardant nature of the coating can be enhanced by the addition of nonflammable aggregates to the coating, for example, sand.

One primary application for silicone rubber has been as a coating for existing building roofs. Traditional roofing elements such as shingles can be made from a variety of materials including tile, slate, wood, concrete, and compositions of asphalt and aggregate. All of such materials experience weathering to varying degrees, with the relatively inexpensive asphalt composition shingles and commercial roofing typically being the most affected by prolonged exposure to UV radiation, temperature variations, and other environmental conditions. Wood shingles are generally more durable than composition shingles and are more aesthetically pleasing. However, because of the flammability of wood shingles, they have been banned in many areas as a fire hazard. Clay tile and slate roofs present little, if any, fire risk but are so expensive that they have not experienced widespread usage. Concrete shingles are durable and fire resistant but are heavy in comparison to other types of materials. Concrete shingles also readily absorb water because of their porous nature, further adding to the load which must be supported by the structural elements of the roof. The disadvantages of each of these materials are lessened by the addition of a layer of silicone rubber. By coating with silicone rubber, wood shingles become flame retardant, concrete shingles become water resistant, and the remaining roofing materials become significantly more resistant to the most common causes of deterioration, thereby lengthening the useful life of the shingles. Furthermore, silicone rubber coatings are not slick to walk on but instead provide a less hazardous surface having sufficient friction to help minimize slipping.

Application of a coating of silicone rubber to other surfaces besides rigid shingle materials can also be extremely advantageous. One example of using silicone rubber to protect a surface is disclosed in U.S. Pat. No. 4,297,265, which discloses the application of a solubilized silicone rubber and silicon dioxide composition onto flexible substrates, such as glass cloth for use as awnings or other flexible building structures.

The flexibility, light weight, and durability of silicone rubber provides a number of suitable applications. Other uses of silicone rubber are also disclosed in U.S. Pat. Nos. 2,751,314, 2,934,464, 2,979,420, and 3,455,762. Furthermore, U.S. Pat. No. 5,338,783 discloses some silicone rubber compositions suitable for the above-described applications, such compositions comprising a mixture of silicone rubber, silicon dioxide, and an aggregate such as sand, gravel, and cinders.

While uses for silicone rubber are known, the potential of physical application of silicone rubber has not been realized because such application in many prior applications was not possible or was impracticable. Because of the difficulty of applying silicone rubber, the full benefits of this composition have not been realized. Silicone rubber, generally in the form of a silicone-aggregate mixture, possesses several characteristics which make it extremely difficult to apply in an efficient economical manner, such as a spray, while maintaining an appropriate coating consistency.

The first problem with applying a silicone-aggregate mixture occurs because it has a very high viscosity. This high viscosity requires a high pressure pump in order to force movement of the mixture through the apparatus. Furthermore, the required pressure usually increases as the distance the mixture is transported to the point of application increases. This is particularly so in roofing situations where it is highly desirable that the mixture be mixed at a location more stable than the roof and then pumped up to the elevation of the roof. The inventors have found that the high pressure required makes rubber hoses impractical. Rubber swelled in diameter until the hose failed.

A problem related to the high viscosity of silicone-aggregate mixtures is the requirement that the mixture be flowable enough to be pumped through the apparatus and through the hose and spray nozzle. The previous methods do not include an operational spraying apparatus for the various problems specific to silicone-aggregate mixtures, but instead anticipate applying a mixture manually. As a result of this manual application, the prior formulations have not been concerned with obtaining a mixture flowable enough to pass through the spraying apparatus, yet not so flowable that it runs and smears and results in a layer insufficiently thick on the application surface. Accordingly, associated with the development of a spraying apparatus is the need to develop a mixture within a desirable range of characteristics.

An additional problem occurs if the silicone-aggregate mixture is exposed prematurely to too much moisture. When this happens, cross linking occurs and the mixture begins to set up and eventually sets up and becomes solid. If cross linking of the mixture goes too far before it is discharged from the apparatus, blockage of the apparatus occurs and it eventually fails completely. This was an additional problem faced by the inventors when rubber hoses were tested to transport the mixture. Air and moisture penetrated into the hose because of the porosity of the rubber. At a certain level of moisture in the hose, the mixture cross linked sufficiently to block the hose, thereby preventing transport of the mixture.

Furthermore, silicone adheres to most materials; thus, it was discovered that even when the required pressure could be attained, the mixture would attach itself to the internal components of the spraying apparatus and quickly block the flow. Of the few materials to which silicone does not adhere (including polytetrafluoroethylene, polyethylene, and polypropylene), it was not known in the art to use such a material such that it would withstand the requirements of spraying a silicone-aggregate mixture, such requirements including the increased pressure and the necessity of preventing moisture from entering the mixture.

An additional problem in development of the invention was cleaning the apparatus following use. With spraying apparatus in general, it is possible to simply flush the material out of the machine and the hose directly following use. However, with silicone-aggregate mixtures, the material remaining inside the machine and the hose simply smears because of its high viscosity and its adhesion properties. The mixture that adhered to the walls would react with the moisture and air and cure the silicone. As a result, reacted silicone built up in the apparatus and hoses after cleaning. This would cause partial or complete blockages after repeated use. Furthermore, options such as replacing the hose every couple of uses is not economically feasible because of the expense involved in obtaining new equipment.

Similar problems exist with various other high viscosity polymer and high aggregate mixtures. Accordingly, the apparatus of the present invention is also suitable for other types of mixtures that present comparable application difficulties. One example of another suitable mixture is an acrylic coating mixture.

As a result of the shortcomings of the art, a need exists for a mixing and spraying apparatus which can accommodate the extreme requirements associated with applying silicone-aggregate mixtures and other high viscosity mixtures in the form of a spray. Specifically, the mixing and spraying apparatus must be powerful enough to overcome the high viscosity of such a mixture, must properly isolate the mixture from atmospheric air and other sources of excess moisture, must be formed of materials that minimize the amount of the mixture adhering to the apparatus, and must be easily cleanable and reusable.

Accordingly, it is an object of this invention to provide an apparatus and method for mixing and spraying a silicone-aggregate mixture onto surfaces which are not readily accessible for manual application or have surfaces that make uniform application difficult. Such surfaces can include roofs, awnings (and other flexible building structures), ship hulls, and any other surfaces which would benefit from a uniform layer of a waterproof, flame retardant, and lightweight material that is resistant to deterioration caused by acids, bases, salts, and ultraviolet (UV) radiation.

It is also an object of this invention to provide an apparatus and method for mixing and spraying a high viscosity mixture which can produce and withstand the elevated pressure necessary to force such a mixture through the apparatus and out of the spray nozzle.

It is another object of this invention to provide an apparatus and method for mixing and spraying a high viscosity mixture, particularly a silicone-aggregate mixture, that has a flowability characteristics within a viscosity range of about 5,000 to about 60,000 cps.

It is a further object of this invention to provide an apparatus and method for mixing and spraying a silicone-aggregate mixture in which excess moisture from atmospheric air and other sources will not come into contact with the silicone-aggregate mixture, thereby preventing cross linking of the mixture and subsequent blockage of the apparatus.

It is a still further object of this invention to provide an apparatus and method for mixing and spraying a silicone-aggregate mixture in which the hose used for transporting the mixture from the mixing apparatus to the point of application is lined internally with a material to which silicone does not adhere, for example, polytetrafluoroethylene (Teflon), polyethylene, or polypropylene.

It is yet another object of this invention to provide an apparatus and method for mixing and spraying a high viscosity mixture such as silicone-aggregate which is cleanable and reusable.

It is a further object of this invention to provide an apparatus and method for mixing and spraying a high viscosity mixture which repeatedly mixes the mixture prior to application to prevent excessive viscosity, and which filters out clumps of unmixed or solidified materials above a certain maximum size.

It is also an object of this invention to provide an apparatus and method for mixing and spraying a high viscosity mixture such as silicone-aggregate wherein the mixture is sprayed in a substantially uniform pattern with a substantially uniform thickness.

The present invention has many advantages, which include: (a) metering mechanisms to maintain the proper ratio of solid and liquid components; (b) a filter screen before the pump to provide the operator with a visual indication of consistency of the mixture so that adjustments may be made; (c) the filter screen also minimizes the entry of overly viscous mixture into the pump; (d) a receiving chamber and an agitator that process the mixture before it reaches the pump so that the spraying operation may be intermittently started and stopped; (e) a hose with a coating of polytetrafluoroethylene (Teflon) and sealable ends that allow for unreacted mixture to be stored in the hose between usage, thereby minimizing waste from cleanup and man hours for cleanup; (f) a pump with a replaceable stator for ease of maintenance; and (g) a sealable pump apparatus to allow storage of unreacted mixture in the pump between usage.

Additional objects and advantages will become apparent and a more thorough and comprehensive understanding may be had from the following description taken in conjunction with the accompanying drawings forming a part of this specification.

SUMMARY OF THE INVENTION

The present invention overcomes the prior problems that made pumping and applying silicone-aggregate mixture impractical, and provides for an apparatus and method for mixing and spraying high viscosity mixtures such as silicone-aggregate.

In one embodiment of the present invention, a sealable pump and hose are provided to discharge the mixture. The pump forces the mixture into the input end and out of the discharge end of the hose. The hose is created with a structure and material that makes it impermeable, nonadherent to the mixture passing through it, and resistant to swelling as a result of the high pressure required. In another embodiment, a pump delivery mechanism can be used to convey the desired amount of mixture to the pump. In a preferred embodiment, this pump delivery mechanism can be an auger screw having a variable speed. In another embodiment of the current invention, the pump delivery mechanism also serves as an agitator to maintain the mixture in a well mixed state before entering the pump. An additional embodiment can include a hose that is internally lined with a coating of polytetrafluoroethylene, such as is sold under the trademark Teflon. A still further embodiment uses a hose that is structurally reinforced. In a preferred embodiment of the current invention, a spray nozzle is attached to the discharge end of the hose to facilitate application of the mixture in the form of a spray. Another embodiment incorporates a pump and a hose that are individually sealable so that the individual pump and hose need not remain connected when they are sealed.

A more preferred embodiment of the current invention includes a receiving chamber mounted to a pump delivery mechanism, which is attached to a pump. A hose is also provided that has an input end attached to the pump discharge port and the hose has a discharge end for applying the mixture. The hose is impervious to moisture, provides an internal surface that does not adhere to the mixture, and has enough internal strength to prevent radial expansion. In a preferred embodiment, the pump delivery mechanism is in the form of a variable speed auger screw. A still more preferred embodiment includes a hose that has an internal coating of polytetrafluoroethylene such as that sold under the trademark Teflon. A further embodiment can include a structurally reinforced hose that can withstand pressures up to about 300 psig (pounds per square inch gauge) or greater. To aid in spraying the mixture, a spray nozzle, preferably a bifluid nozzle, can also be attached to the discharge end of the hose. Two additional embodiments can include a pump and hose that are sealable together and a pump and hose that are sealable individually.

A still more preferred embodiment of the present invention includes a mixer in which the liquid and solid components are admixed, a filter adjacent to the discharge of the mixer and a receiving chamber located on the other side of the filter to receive the mixture. An attached pump delivery mechanism dispenses and meters the flow of the mixture to a pump and, in the preferred embodiment, an attached pressure tube. The input end of a hose is attached to the pressure tube and the discharge end is left loose. The hose is impermeable, nonadherent to the mixture, and nonswellable. A nozzle is attached to the discharge end of the hose for controlled spraying of the mixture. In the preferred embodiment the nozzle is a bifluid nozzle.

In an another embodiment of the invention a steam emitter is attached to the spray apparatus. This steam emitter allows steam to be applied to the freshly sprayed composition in order to speed the curing of the silicone. Steam can be supplied from any type of conventional source.

In accordance with another embodiment of the present invention, a method is provided for applying a high viscosity mixture wherein a rotor-stator pump is charged with an unreacted silicone-aggregate mixture, the mixture is pumped from a pump into a hose that is impervious, nonadherent, and nonswellable, and the hose transports the mixture from its input end to its discharge end. The unreacted mixture is then sprayed onto a surface and allowed to cross link to form a stable surface.

Yet another embodiment of the present invention includes a method for applying an unreacted silicone-aggregate mixture wherein the mixture is agitated and filtered, metered into a pump, pumped and transported through a hose, applied from the discharge end of the hose, and then allowed to react on the application surface. The hose prevents penetration of moisture into the mixture, prevents adhesion of the mixture to the hose, and prevents distention of the hose from the high pressures required to transport the mixture.

In another embodiment, the present invention relates to a sprayable composition having about 0 to about 20 weight percent of filler, about 10 to about 48 weight percent of silicone, about 10 to about 49 weight percent of solvent, about 9 to about 90 weight percent of aggregate, about 0 to about 5 weight percent of desiccant, and about 0 to about 5 weight percent of pigment.

In another embodiment, the present invention relates to a sprayable composition with a high aggregate loading having about 0 to about 20 weight percent of filler, about 10 to about 25 weight percent of silicone, about 10 to about 20 weight percent of solvent, about 50 to about 90 weight percent of aggregate, about 0 to about 5 weight percent of desiccant, and about 0 to about 5 weight percent of pigment.

In another embodiment, the present invention relates to a sprayable condition with a low aggregate loading having about 0 to about 1 weight percent of filler, about 39 to about 48 weight percent of silicone, about 40 to about 49 weight percent of solvent, about 9 to about 12 weight percent of aggregate, about 0 to about 1 weight percent of desiccant, and about 0 to about 1 weight percent of pigment.

In another embodiment, the filler is a density reducing agent such as ceramic microspheres, glass bubbles, glass microspheres, plastic microspheres, plastic microspheres, zeeospheres, and combinations thereof.

In another embodiment, the filler is a density modifying agent such as solid microspheres, hollow microspheres, non spherical material, and combinations thereof.

In still yet another embodiment, the present invention relates to a sprayable composition having 0 to 20 weight percent of a density reducing agent, from about 10 to about 25 weight percent of a reactive silicone, from about 10 to about 20 weight percent of a solvent or diluent for the silicone, from about 40 to about 90 weight percent of an aggregate, from 0 to about 5 weight percent of a desiccant, from about 0 to about 1 weight percent of a catalyst for the silicone, from about 0 to about 5 weight percent of a pigment, and from about 0 to about 0.5 weight percent of a dust suppressing agent.

BRIEF DESCRIPTION OF THE DRAWINGS

The present invention will be better understood from reference to drawings in connection with the detailed description of the invention, which description is not limiting of the invention.

FIG. 5 is a top view of the receiving chamber, the filter, and the pump delivery mechanism of the apparatus shown in FIG. 1;

FIG. 6 is a partial cross-sectional view of the receiving chamber and the filter shown in FIG. 5 taken along the line 6—6, depicting the filter screen guide;

FIG. 7 is a side view of an agitating drive shaft, a preferred embodiment of the pump delivery mechanism shown in FIG. 5;

FIG. 8 is a cross-sectional view of the pump and related components shown in FIG. 1;

FIG. 9 is a perspective view of a mobile support structure used for supporting and transporting the mixing and spraying apparatus of the present invention;

DETAILED DESCRIPTION

Figure 1:
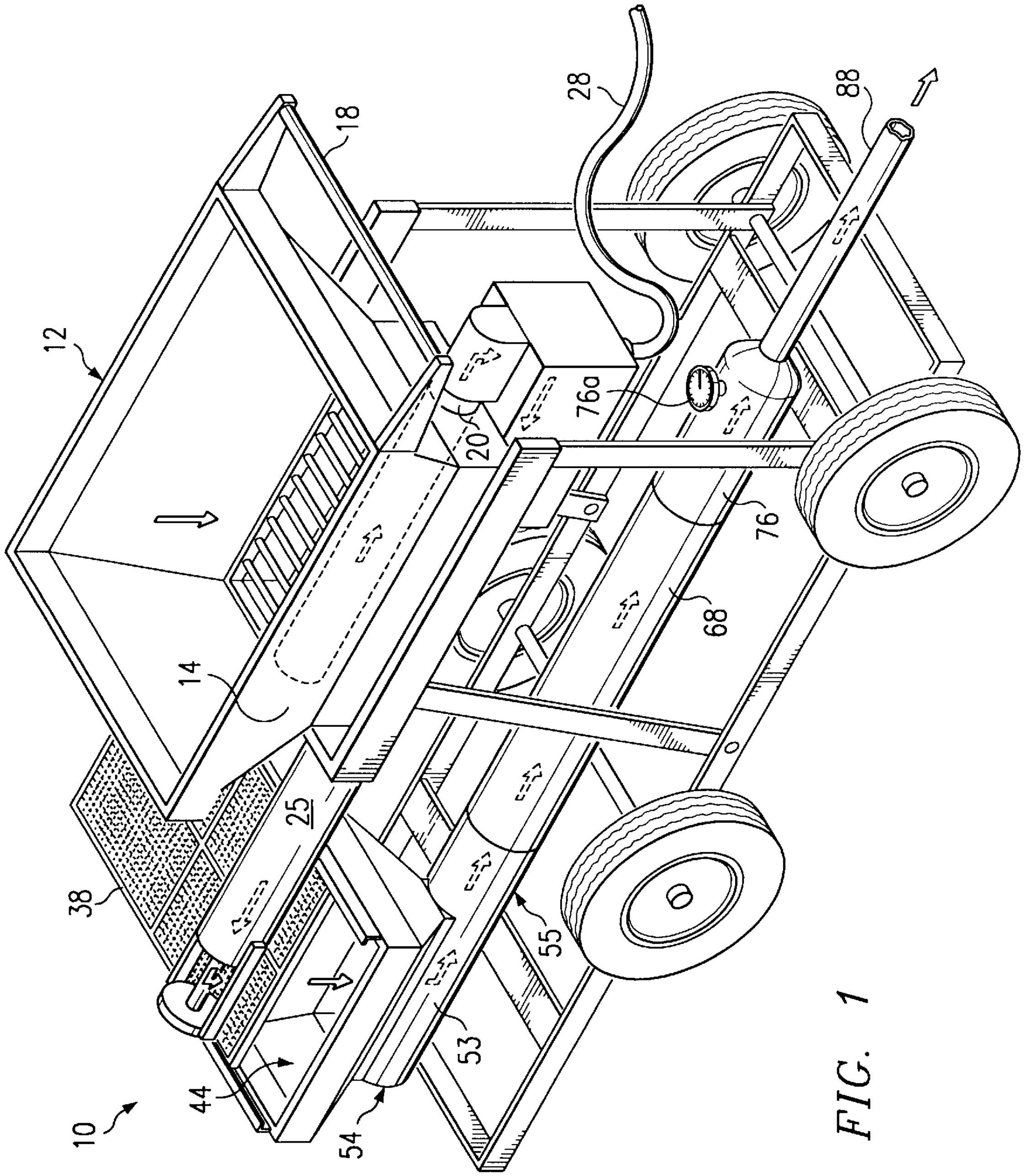
FIG. 1 is a perspective view of an apparatus for mixing and spraying high viscosity mixtures embodying the present invention.

Reference is first made to FIG. 1 showing a perspective view of the apparatus for mixing and spraying high viscosity mixtures according to the present invention. Although the preferred embodiment of the apparatus of the present invention is intended primarily for mixing and spraying silicone-aggregate mixtures, the apparatus can be used for mixing various other mixtures having a high viscosity. Like reference numbers in the different figures refer to the same parts.

Figure 2:
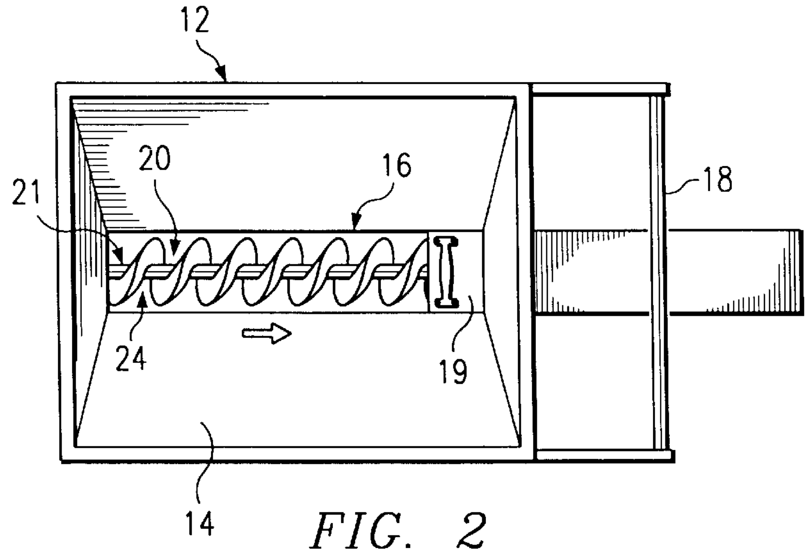
FIG. 2 is a top view of the aggregate hopper shown in FIG. 1.

The mixing and spraying apparatus 10 of the present invention includes one or more aggregate hoppers 12 for receiving and storing aggregate as shown in FIGS. 1 and 2. The overall shape of aggregate hopper 12 is immaterial so long as it can receive and store aggregate. Aggregate hopper 12 has a base 14 with an exit aperture 16 large enough to accommodate the required flow of aggregate out of aggregate hopper 12. Aggregate hopper 12 can also have a lift bar 18 to facilitate lifting and pulling apparatus 10.

In alternative embodiments of the present invention, multiple aggregate hoppers in a single apparatus 10 may be used for receiving and storing the separate components necessary to create an aggregate mixture with desired characteristics. In this manner, a greater number of mixture compositions can be created by receiving and storing the individual mixture components (for example, aggregate, filler, which can be used to affect density, and coloring agents) and then dispensing the desired components at the desired proportions. The user therefore has more control over the properties of the applied mixture and can easily change the mixture when necessary for different applications. Also, by using multiple hoppers, it will often be unnecessary to clean the hoppers each time a different aggregate mixture composition is used because the same components may be used but simply in different ratios. With a single aggregate hopper, cleaning would be necessary each time a different mixture is required in order to ensure an uniform aggregate composition.

As best illustrated in FIG. 2, an aggregate dispensing tube 20 is mounted below aggregate hopper 12 such that the aggregate in the base 14 of aggregate hopper 12 passes through exit aperture 16 and into the input end 21 of aggregate dispensing tube 20. Internally mounted inside aggregate dispensing tube 20 is an aggregate dispenser 24.

Figure 3:
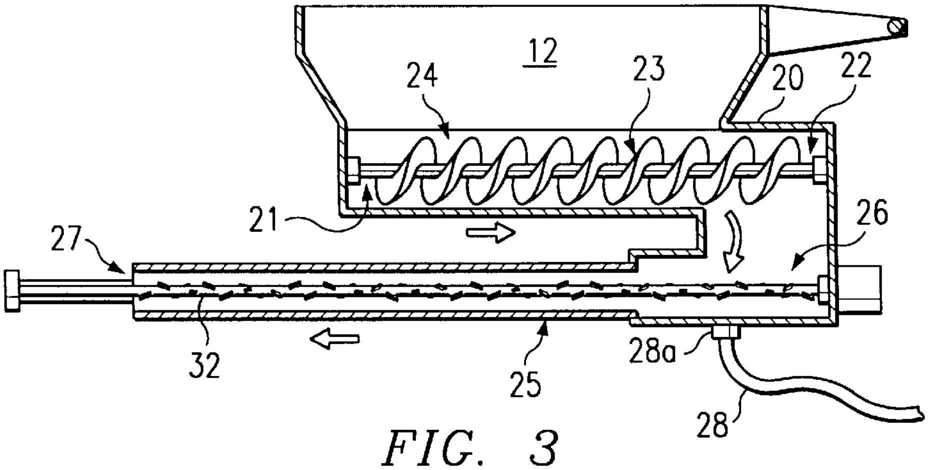
FIG. 3 is a cross-sectional view of the aggregate hopper, the aggregate dispenser, the silicone reactant conduit, and the agitator shown in FIG. 1.

As shown in FIGS. 2 and 3, aggregate dispenser 24 is a mechanism for withdrawing aggregate through the exit aperture 16 of aggregate hopper 12 and into the input end 21 of aggregate dispensing tube 20, and then conveying the aggregate to the output end 22 of aggregate dispensing tube 20. A sliding door 19 can be provided between the exit aperture 16 of aggregate hopper 12 and the input end 21 of aggregate dispensing tube 20 for controlling the rate of flow of aggregate or for stopping the flow. In the preferred embodiment shown in FIG. 3, aggregate dispenser 24 comprises an auger screw 23 mounted longitudinally inside aggregate dispensing tube 20 such that the auger screw 23 can rotate about its longitudinal axis, thereby conveying aggregate from aggregate hopper 12 to the output end 22 of aggregate dispensing tube 20. In this preferred embodiment, the rotational velocity of auger screw 23 is variable so that the rate of withdrawing aggregate from aggregate hopper 12 can be manipulated by the operator. By varying this rate of withdrawal, the operator can increase or decrease the proportion of aggregate in the final silicone-aggregate mixture to fit the needs of the application. There are many other suitable forms of aggregate dispenser 24, including a conveyor belt, a vibrating incline, and a piston mechanism, among others.

As shown in FIG. 3, the aggregate is dispensed through the output end 22 of aggregate dispensing tube 20 and into a mixing tube 25 attached in communication with aggregate dispensing tube 20. The aggregate enters mixing tube 25 through an input end 26 and exits mixing tube 25 through an output end 27. In a preferred embodiment, the input end 26 of mixing tube 25 is attached directly below the output end 22 of aggregate dispensing tube 20 so that the aggregate is forced into mixing tube 25 by the force of gravity and by the force created by additional aggregate being driven toward the output end 22 of aggregate dispensing tube 20.

Figure 12:
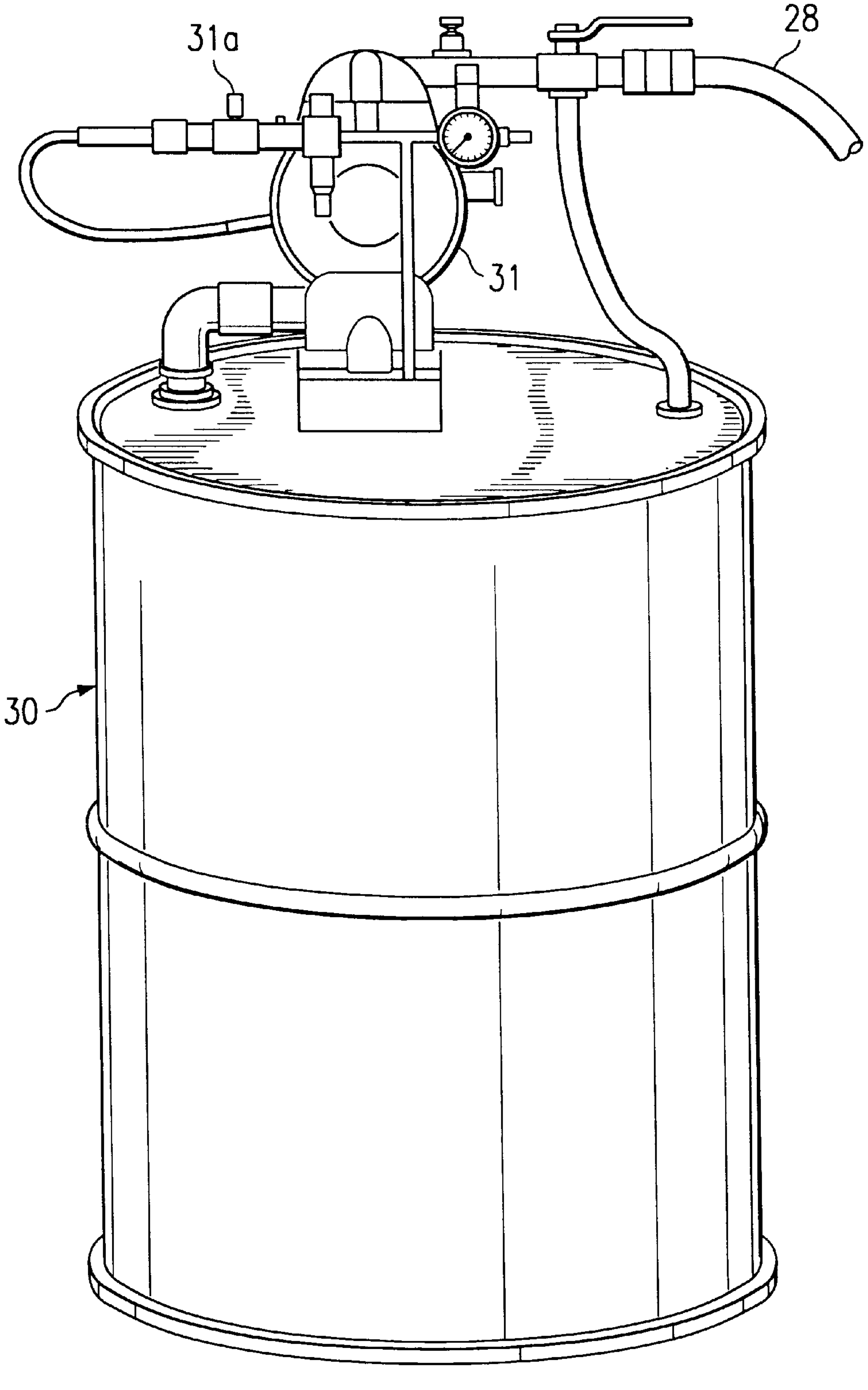
FIG. 12 is a perspective view of a silicone reactant supply tank and a silicone reactant pump for supplying silicone reactant to the mixing and spraying apparatus of the present invention.

As shown in FIG. 3, a silicone reactant conduit 28 is attached to mixing tube 25 near its input end 26 for injecting silicone reactant into the aggregate and thus creating the desired silicone-aggregate mixture. FIG. 12 illustrates a preferred embodiment of a silicone reactant supply tank 30 for storing the silicone reactant until it is injected into the aggregate inside apparatus 10. In this preferred embodiment, a silicone reactant pump 31 is mounted on the top surface of supply tank 30 for withdrawing the silicone reactant from supply tank 30 and injecting it into mixing tube 25 through silicone reactant conduit 28. Preferably, a variable speed control 31*a* is provided to permit regulation of the flow from reactant pump 31. However, supply tank 30 and silicone reactant pump 31 can be any combination of apparatus that is capable of storing the silicone reactant and conveying it to mixing tube 25. In the preferred embodiment, the silicone reactant is a mixture of unreacted silicone, solvent or diluent, and a desiccant.

In the preferred embodiment, the flow rate of silicone reactant through silicone reactant conduit 28 is variable such that the composition of the mixture being applied can be varied. A valve 28*a* can be positioned at the discharge end of the silicone reactant conduit to control flow so as to allow adjustment to the silicone-aggregate mixture composition. The composition of silicone reactant being stored in supply tank 30 and injected through silicone reactant conduit 28 can be varied by the operator according to the requirements of the particular application. Suitable silicone reactant can include silicone alone or silicone with a solvent or some other component providing desirable characteristics. For example, one particular preferred combination is a silicone reactant containing silicone and a silane desiccant such as methyltriacetoxysilane wherein the desiccant helps to prevent the silicone reactant from beginning to cross link and set up if it is exposed to moisture prior to application.

Figure 4:
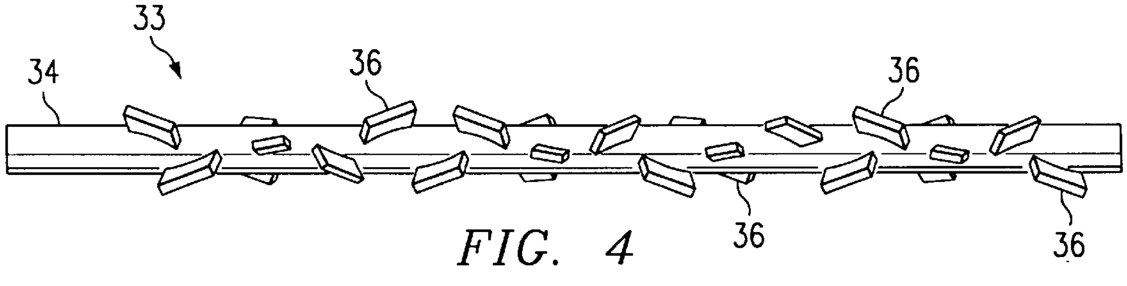
FIG. 4 is a side view of the agitator shown in FIG. 3.

FIG. 3 also illustrates that mixing tube 25 contains an agitator 32 for mechanically mixing the aggregate with the silicone reactant to form a high viscosity liquid silicone-aggregate mixture. As agitator 32 mixes the silicone-aggregate mixture, the mixture is also forced from the input end 26 of mixing tube 25 and toward the output end 27 by the pressure created from aggregate dispenser 24 and silicone reactant conduit 28 pushing additional aggregate and silicone reactant into mixing tube 25. As shown in FIG. 4, the preferred embodiment of agitator 32 is an agitating shaft 33 which can be rotatably mounted inside mixing tube 25 to rotate about its longitudinal axis. Agitating shaft 33 consists of a cylindrical shaft 34 with many agitating teeth 36 of varying shapes attached in substantially random positions and directions. Additionally, the rotation of agitating shaft 33 causes the silicone-aggregate mixture to be subjected to varying forces from agitating teeth 36, thereby creating a mixing motion as it flows toward output end 27. Other embodiments of agitator 32 can also be used because the aggregate mixes very easily with the silicone reactant. As a result, any form of mechanical agitation can be used as an agitator 32 in mixing tube 25, including, but not limited to, an auger screw or sonic agitation.

FIGS. 1 and 5 illustrate that a filter 38 is mounted near the output end 27 of mixing tube 25 such that the clumps of unmixed or solidified silicone-aggregate mixture are filtered from the mixture as it exits the output end 27 of mixing tube 25. The preferred embodiment of filter 38 shown in FIG. 5 is a screen removably mounted in a horizontal orientation and located below the output end 27 of mixing tube 25 so that the silicone-aggregate mixture flows out of output end 27 and falls onto filter 38 by the force of gravity. Filter 38 thereby allows only the mixed silicone-aggregate mixture to flow through while the clumps of material remain. Once a substantial amount of material is remaining on filter 38, the user can manually remove the clumps of material and reuse filter 38. However, it is preferable that filter 38 be used only once and then disposed of and replaced because the mesh 42 of filter 38 could gradually become clogged with solidified silicone-aggregate mixture that would prevent additional mixture from properly passing through filter 38, thereby creating suboptimal operation.

In a preferred embodiment, filter screen 38 is twice the width of the opening to the receiving chamber 44 below it and is slidably disposed over the receiving chamber. This allows the operator to slide the filter over and clean out the other half of the filter, thereby facilitating continuous operation of the unit. The filter can be repeatedly shifted back and forth so that a clean filter is maintained.

In an embodiment preferred for filtering silicone-aggregate mixture, the mesh 42 of filter 38 allows particles 0.25 inches or smaller in diameter to pass but catches larger particles. However, this mesh size can be varied to accommodate the requirements for different mixtures used in different applications. One additional advantage of using the preferred filter 38 is that the operator then has a visual indication of whether or not the mixture formulation is at an appropriate level. Specifically, if an excessive amount of mixture is being filtered out, then the operator can use proportionately less aggregate, and if very little mixture is being filtered out, then the operator can use proportionately more aggregate.

Also illustrated in FIG. 5 is a receiving chamber 44 that receives the mixture after it has been filtered by filter 38. To simplify the process of cleaning or replacing filter 38, a preferred embodiment includes a receiving chamber 44 with an upper edge 46 that has filter screen guides 48 for locating and securing filter 38 in its proper position as shown in FIG. 6. Filter screen guides 48 allow filter 38 to be easily slidable on and off of receiving chamber 44, thereby providing for easy replacement of filter 38 and shifting of the filter during use as described above. As with aggregate hopper 12, the overall shape of receiving chamber 44 is irrelevant so long as it can receive and store the mixture. Receiving chamber 44 has a base 50 with an exit aperture 52 large enough to accommodate the required flow of silicone-aggregate mixture out of receiving chamber 44.

As illustrated in FIGS. 1 and 5, attached to the base 50 of receiving chamber 44 is the input end 54 of a pump delivery conduit 53 that receives the silicone-aggregate mixture through the exit aperture 52 of receiving chamber 44. A pump delivery mechanism 56 is mounted inside pump delivery conduit 53 for withdrawing the mixture from receiving chamber 44 and preferably has a variable speed control to allow the operator to adjust the rate the mixture is moved toward the output end 55 of pump delivery conduit 53. In the preferred embodiment shown in FIG. 5, mixture agitating mechanism 56 comprises a variable speed auger screw. In another embodiment, agitating mechanism 56 is a variable speed agitating drive shaft 60 as shown in FIG. 7. Similar to agitating shaft 33, agitating drive shaft 60 comprises a cylindrical shaft 62 with many agitating teeth 64 of varying shapes attached in substantially random positions and directions, but agitating drive shaft 60 also has a spiral coil 66 encircling cylindrical shaft 62. The advantage of using a pump delivery mechanism 56 like agitating drive shaft 60 is that agitating teeth 64 continue mixing the mixture and helical coil 66 moves the mixture towards the output end 55 of pump delivery tube 53 as cylindrical shaft 62 is rotated. However, because of the ease with which silicone and aggregate combine to create a mixture, this dual function can also be accomplished using other alternative mechanisms.

As illustrated in FIG. 8, a pump 68 is attached to the output end 55 of pump delivery conduit 53 so that it receives the silicone-aggregate mixture being withdrawn from receiving chamber 44. A preferred embodiment of apparatus 10 utilizes a standard rotor/stator pump as pump 68. This provides the advantage of using a pump that is readily replaceable by an off-the-shelf product and therefore simplifies maintenance of apparatus 10. Pump 68 receives the mixture from pump delivery conduit 53 at its input end 72 and discharges the mixture at its output end 74. In an embodiment preferred for pumping silicone-aggregate mixture, a pressure tube 76 has an input end 78 attached to the output end 74 of pump 68. Pressure tube 76 is a cylinder 82 which has an opening which receives a pressure value **76*a* for monitoring the pressure. In a preferred embodiment pressure tube 76 has an internal diameter that decreases or tapers from its input end 78 to its output end 80. Pressure tube 76** has been found useful for providing a location to mount a pressure gauge and is believed to improve the flow of the silicone aggregate mixture to the hose.

It is preferred that each of the components of apparatus 10 used for mixing and pumping the mixture should be mounted on a support structure, and even more preferably a mobile support structure 86 as depicted in FIG. 9. Such a mobile support structure 86 can take the form of any type of cart or other means capable of supporting apparatus 10 while also providing easy transportation of the invention.

As further shown in FIG. 8, a hose 88 is attached at its input end 90 to the output end 80 of pressure tube 76 (or the output end 74 of pump 68 if pressure tube 76 is not used) while its discharge end 92 is left free to be controlled by the operator. Because of the extreme requirements of spraying high viscosity mixtures, careful selection of the material and method of construction of hose 88 is important. The primary application of this invention is for silicone-aggregate, which possesses properties that make it extremely difficult to apply in the form of a spray. In particular, the high viscosity of silicone-aggregate requires that sufficient pressure be applied to the mixture before it will travel through the hose. The pressure needed to move the mixture through the hose of given diameter is dependent primarily on the speed of travel through the hose, the length of travel, and the viscosity of the mix. In the preferred embodiment of hose 88 which has an internal diameter of from about 0.5 to about 1.5 inches with a diameter of about 1.0 inches being most preferred. Accordingly, hose 88 must be created from a material and designed with a structure that can withstand elevated pressures that can reach typically from 300 to 600 pounds per square inch gauge (psig). Furthermore, there are only a limited number of materials to which silicone does not adhere so the choice of materials is also limited. This choice is further limited by the requirement that the material be impermeable or impervious to moisture so that the silicone-aggregate mixture does not begin to cross link before it is applied.

To meet these requirements for transporting silicone-aggregate mixture, the preferred embodiment uses a food-grade commercial hose that has an internal liner or coating of polytetrafluoroethylene, which is sold under the trademark Teflon. This internal liner or coating prevents adhesion of the silicone-aggregate to the interior of hose 88 as the mixture travels toward the point of application. This internal coating is also impermeable such that moisture will not seep through hose 88 and cause the mixture to cross link before it is applied. In order to withstand the high pressure necessary in this application, the preferred hose 88 is also structurally reinforced. Specifically, an internally constructed wire-grade coil provides sufficient radial strength to prevent swelling of hose 88. Other alternative embodiments are also possible, but this has been found to be the preferred embodiment based on the current state of the art.

Hose 88 can be of varying lengths depending on the distance between the operator's desired location of apparatus 10 and the point of application of the silicone-aggregate or other high viscosity mixture. Typically, as the length of hose 88 is increased, the pressure required to move the mixture at the desired rate also increases. In a preferred embodiment, hose 88 is 300 feet long so that it is of sufficient distance to leave apparatus 10 on solid ground for most applications. In this manner, hose 88 can be used to transport the mixture from the location of apparatus 10 to the point of application, regardless of whether the mixture is being applied to the roof of a building, the hull of a ship, a flexible awning or other flexible structure, or any other desired surface. The pressure within hose 88 when it is 300 feet long can reach about 400 psig or greater, but the preferred embodiment of structure and material already described are sufficient to withstand such elevated pressures. In the preferred embodiment, the hose is supplied in sections of from about 20 to 30 feet in length which can be coupled together. This permits the length of the hose to be increased or decreased as needed. Also, this provides for more convenient transportation, storage, and cleaning.

Figure 10:
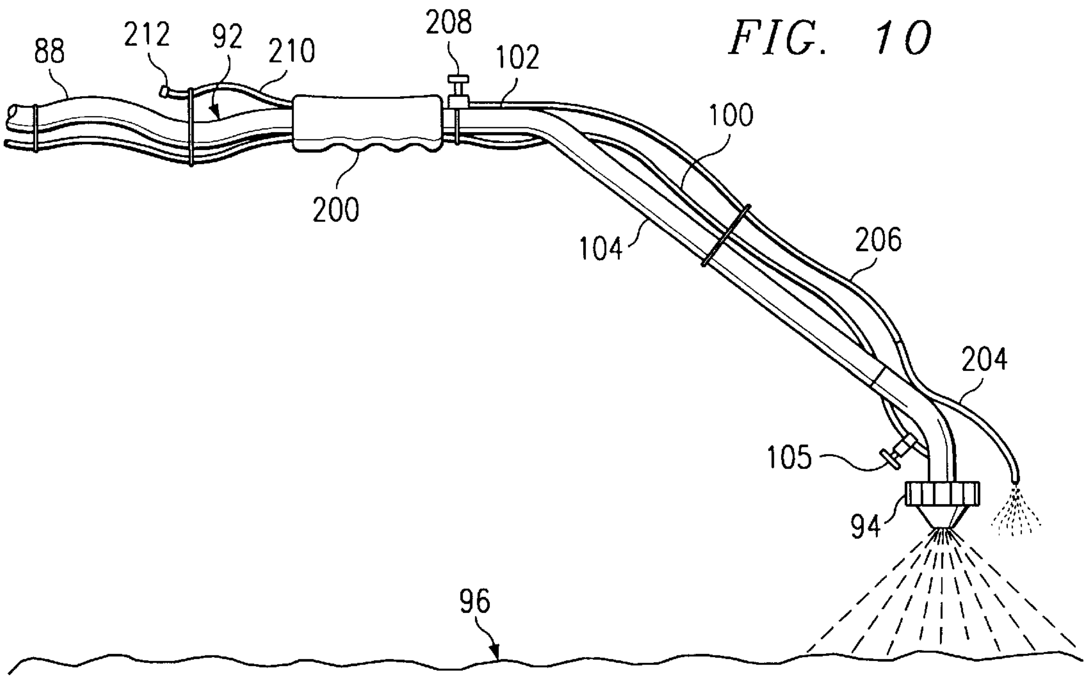
FIG. 10 is a side view of a hose, a spray handle, and a spray nozzle embodying the present invention.

As shown in FIG. 10, it is preferred to attach a spray nozzle 94 to the discharge end 92 of hose 88 because spray nozzle 94 will help to apply the silicone-aggregate mixture to a desired application surface 96 in a controlled, uniform manner. In the preferred embodiment depicted, the spray nozzle 94 is a bifluid spray nozzle which is known in the art. To properly use such a bifluid spray nozzle, an air injection conduit 100 is attached to the spray nozzle 94 to inject and mix pressurized air into the silicone-aggregate mixture exiting hose 88. The pressurized air injected into the mixture atomizes the mixture as it exits spray nozzle 94, thereby creating a uniform spray pattern that coats application surface 96 with a substantially uniform thickness. For ease of operation, a spray handle 102 may also be used which attaches between the discharge end 92 of hose 88 and spray nozzle 94. Spray handle 102 comprises a rigid tube 104 formed at an angle towards application surface 96 so that the mixture may be accurately sprayed without the need for the operator to bend or stretch toward application surface 96.

Figure 11:
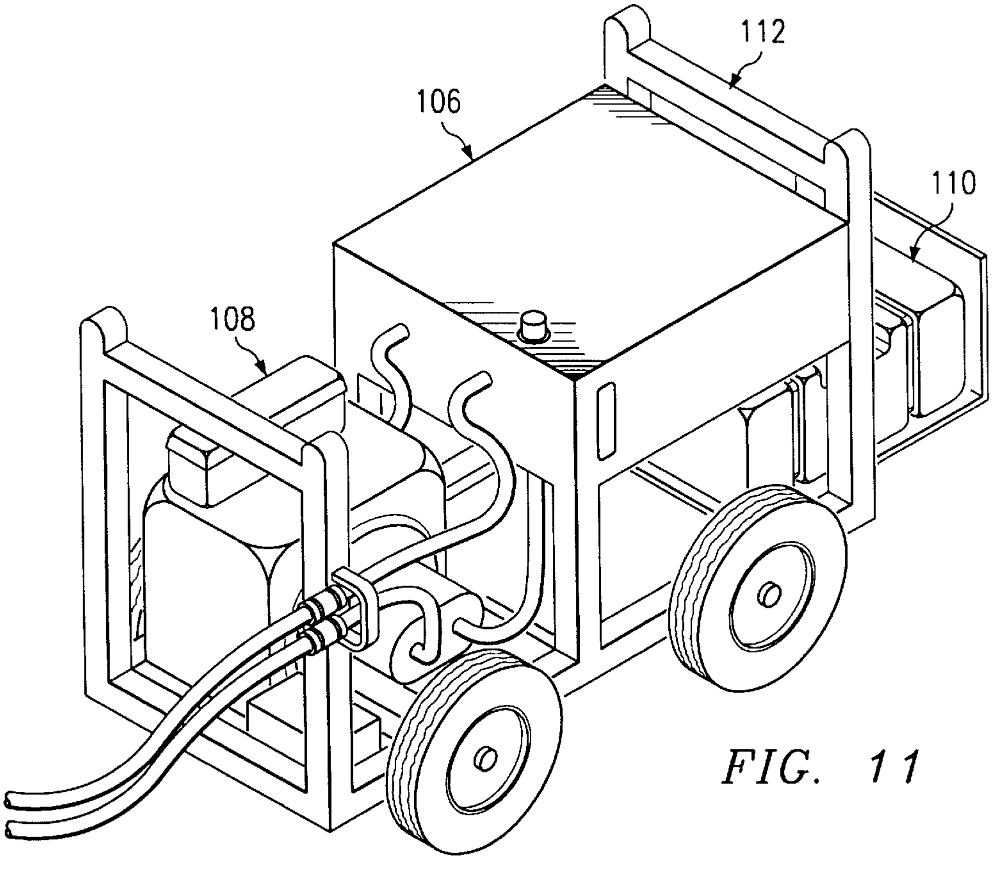
FIG. 11 is a perspective view of a hydraulic power pack and transport cart for powering the mixing and spraying apparatus of the present invention.

In the preferred embodiment of the current invention, power is supplied to apparatus 10 by a hydraulic power pack 106 as shown in FIG. 11. To operate hydraulic power pack 106, an engine 108, such as a gas or diesel engine, is used and a reserve gas tank 110 is recommended. The power output of hydraulic power pack 106 and engine 108 are variable and controlled by the operator such that the speed of aggregate dispenser 24, metering mechanism 56, and pump 68 can be controlled and thus the rate of application of silicone-aggregate mixture can be controlled. Other alternative forms of providing constant or variable power to apparatus 10 are also possible for operating the present invention. Each of these components is preferably supported and contained separately from apparatus 10 on a transport cart 112. However, the components can be combined on a single cart.

It is also preferable that operator controls for starting and stopping apparatus 10 are included at or near mobile support structure 86 where the mixture is mixed and pumped, and also on hose 88 near discharge end 92. By providing dual controls, there is less risk that the machine will be damaged or the operators will be injured because both the spray operator handling hose 88 and spray nozzle 94 and the mixing and pumping operator handling the mixing and pumping components have the ability to quickly stop the apparatus.

Finally, cleaning of apparatus 10 after use is recommended to prevent the silicone-aggregate mixture from solidifying in the apparatus. However, cleaning can be delayed or minimized if apparatus 10 or components thereof are sealed immediately after use. If apparatus 10 is not cleaned after use, then the moisture and air will cause the mixture to harden and adhere to the components and eventually cause obstructions. Removal of silicone-aggregate mixture from these components is difficult and wasteful. To reduce cleaning and waste, portions of apparatus 10 can be sealed to prevent moisture and air from reaching the silicone. In the case of hose 88, it is usually sufficient to seal the ends in a water tight manner. The seal is also preferably air tight. The unreacted silicone-aggregate mixture can be stored in the hose and applied later. Pump 68 can also be sealed. However, because receiving chamber 44 is wide and contains a good deal of air, it is preferred to overlay it with an inert gas, preferably argon. The inert gas replaces the air and moisture the mixture carries and isolates the mixture from atmospheric air, thus sealing the pump. The next day, when apparatus 10 is unsealed, there is usually a thin layer of solidified mixture on top of the mixture in receiving chamber 44. This layer can easily be peeled off in long strips, leaving pump 68 ready to be charged with fresh mixture which will displace the unreacted mixture stored in the pump. Preferably, receiving chamber 44 is sealable and the discharge end 92 of hose 88 is sealable such that those components between, including mixture dispensing tube 53, pump 68, and pressure tube 76, will also be sealed.

However, each of these components can also be individually sealable so that they can be sealed even after disassembly of apparatus 10.

Figure 13:
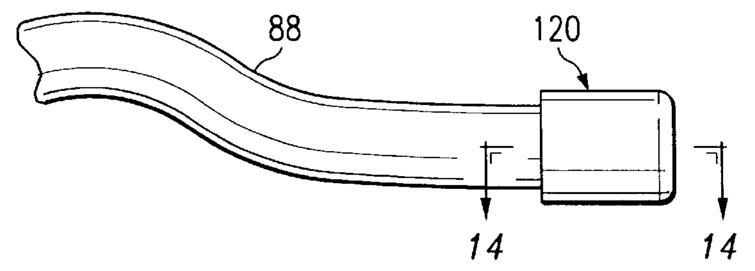
FIG. 13 is a partial side view of a hose sealed according to the present invention with a screw cap.
Figure 14:
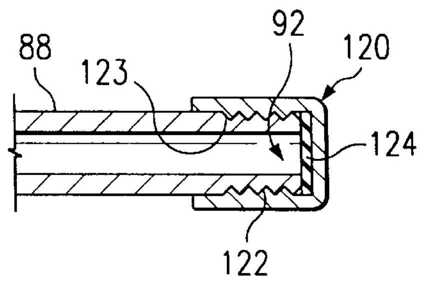
FIG. 14 is a partial cross-sectional view of the hose sealed with a screw cap shown in FIG. 13, taken along the line 14—14.
Figure 15:
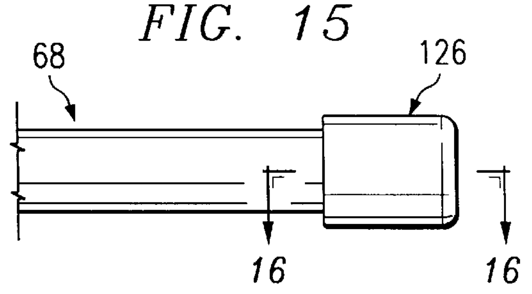
FIG. 15 is a partial side view of a pump sealed according to the present invention with a lipped cap.
Figure 16:
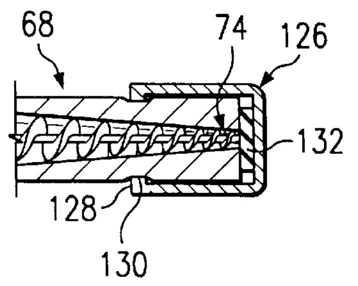
FIG. 16 is a partial cross-sectional view of the pump sealed with a lipped cap shown in FIG. 15, taken along the line 16—16.
Figure 17:
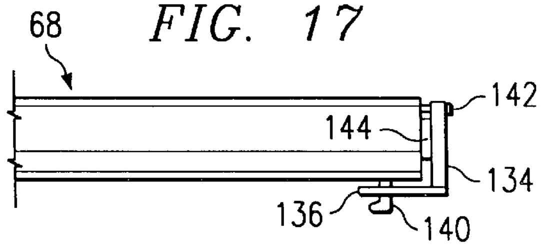
FIG. 17 is a partial side view of a pump sealed according to the present invention with a latching cap.
Figure 18:
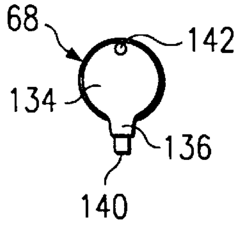
FIG. 18 is an elevational view of the pump sealed with a latching cap shown in FIG. 17.
Figure 19:
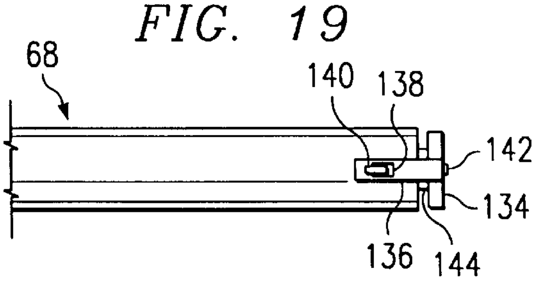
FIG. 19 is a partial top view of the pump sealed with a latching cap shown in FIG. 17.

Several structures for individually sealing hose 88 and pump 68 are illustrated in FIGS. 13 through 19. In FIGS. 13 and 14, a screw cap 120 for sealing hose 88 is shown. In this embodiment, the external surface of hose 88 has threads 122 at discharge end 92 and the internal surface of screw cap 120 has threads 123, thus allowing screw cap 120 to be screwed onto discharge end 92 and creating a tight seal. A rubber seal 124 can also be attached to the internal sealing surface of screw cap 120 to provide a better seal with hose 88. Similarly, a screw cap 120 can be used to seal the input end 90 of hose 88. In FIGS. 15 and 16, a lipped cap 126 for sealing pump 68 is shown. In this embodiment, lipped cap 126 has a lip 128 that slides over the external surface of pump 68 until it seats in a seating groove 130 formed in the circumference of pump 68. A rubber seal 132 is attached to the interior of lipped cap 126 such that it tightly seals the output end 74 of pump 68 when lip 128 is properly seated in seating groove 130. Lipped cap 126 can also be used to seal pump 68 with a seating ridge formed in the circumference of pump 68 rather than a seating groove 130, and can also be used to seal the input end 72 of pump 68. Finally, FIGS. 17, 18, and 19 show a latching cap 134 for sealing pump 68. In this embodiment, latching cap 134 has a latch arm 136 with a hole 138 for receiving a latch peg 140 extending from the external surface of pump 68. After latch arm 136 is attached to latch peg 140, latching cap 134 is seated over the output end 74 of pump 68 and a screw 142 is inserted through latching cap 134 and attached to the output end 74 of pump 68. A rubber seal 144 can also be attached to the interior of latching cap 134 to contact the output end 74 of pump 68 and create a tighter seal. Again, latching cap 134 can also be used to seal the input end 72 of pump 68. Other embodiments for sealing the components of apparatus 10 include a tight sealing cap having a seal and pressure latch, a lip and ridge lid similar to those products sold under the Tupperware trademark, and any other sealing structures known in the art for creating tight seals.

In a preferred method of cleaning apparatus 10, mixing tube 25 and agitator 32 are removable so that they can be water blasted and swabbed with a rag after using apparatus 10. Any dried material left in mixing tube 25 and agitator 32 can be peeled off. Spray nozzle 94 and spray handle 102 are also removed from the discharge end 92 of hose 88 and then water blasted and swabbed. The internal portions of the remaining components of apparatus 10 can then be sealed while these components are still assembled rather than sealing pump 68 and hose 88 individually. In one embodiment, a plastic garbage bag or other impermeable material is first placed on top of the silicone-aggregate mixture remaining in receiving chamber 44 and pressed into the wet mixture near the upper edge 46. The discharge end 92 of hose 88 is also capped with an impermeable material that isolates the interior of hose 88 from the atmospheric air. To maintain the isolation of the silicone-aggregate mixture, any joints in hose 88 should be covered with duct tape. An inert gas such as argon is then applied underneath the plastic garbage bag and into the silicone-aggregate mixture in receiving chamber 44. Finally, duct tape is applied to the edges of the plastic garbage bag to seal the bag against receiving chamber 44. Alternatively, any of the embodiments described above for sealing the discharge end 92 of hose 88 can also be used.

In alternative embodiments of the present invention, various features and functions can be automated for ease of operation. For example, an automated control panel can be utilized to more accurately monitor and maintain the proportions and ratios of the mixture components used. This would provide more precise and uniform characteristics in the mixtures obtained and would also provide further protection against blockage of apparatus 10 by protecting against inaccurate mixture ratios that create extremely viscous material which cannot be processed by apparatus 10. Furthermore, automated controls allow the invention to be operated by fewer people, thus allowing greater efficiency for the owner/operator.

Having described the structure of the present invention in detail, the overall function is described as follows. First, the aggregate is placed in aggregate hopper 12. If multiple aggregate hoppers are used, then the desired aggregate components are placed in the individual aggregate hoppers. Once apparatus 10 is activated, then the aggregate is dispensed from aggregate hopper 12 out of exit aperture 16 and into aggregate dispensing tube 20 by aggregate dispenser 24. The rate of dispensation of the aggregate is controllable by the operator because aggregate dispenser 24 preferably has variable speeds. If aggregate dispenser 24 is comprised of an auger screw as preferred, then the rate of revolutions can be varied. If aggregate dispenser 24 is comprised of a conveyor belt, then the rate of the belt can be varied. Similarly, if other embodiments are chosen for aggregate dispenser 24, then the rate would still preferably be variable.

After aggregate dispenser 24 draws the aggregate into aggregate dispensing tube 20, the aggregate then enters the input end 26 of mixing tube 25. Silicone reactant is then injected into mixing tube 25 through silicone reactant conduit 28, thus creating a silicone-aggregate mixture. At this point, agitator 32 begins mixing the silicone-aggregate mixture while it is forced toward the output end 27 of mixing tube 25. In the preferred embodiment, the rotation of the agitating teeth 36 attached to agitating shaft 33 create the mixing motion of agitator 32, but alternative embodiments can be used to create functionally equivalent results. Once the mixture exits the output end 27 of mixing tube 25, filter 38 removes the larger unmixed and solidified portions of the mixture before the rest of the mixture enters receiving chamber 44. In the preferred embodiment of filter 38, filter 38 is removed and cleaned, or preferably replaced, once so much of the mixture has been removed that the rate of flow of the silicone-aggregate mixture through filter 38 has been substantially reduced.

After receiving chamber 44 has received the silicone-aggregate mixture, the mixture is then withdrawn from the exit aperture 52 of receiving chamber 44 and drawn into the input end 54 of pump delivery tube 53 by mixer agitating mechanism 56. In the preferred embodiment of mixer agitating mechanism 56, the mixture is further mixed by the agitating teeth 64 of agitating drive shaft 60 and is conveyed toward the output end 55 of pump delivery tube 53 by the helical coil 66 of agitating drive shaft 60. However, this mixing and conveying action is also accomplished by using an auger screw as mixture agitating mechanism 56. From the output end 55 of pump delivery tube 53, the mixture is forced into the input end 72 of pump 68, preferably a rotor/stator pump, and pump 68 increases the pressure applied to the mixture as it is forced toward the output end 74 of pump 68. In a preferred embodiment, pressure tube 76 then receives the mixture at its input end 78 and conveys it to the input end of the hose. The pressure tube 76 cushions the pressure shock on the hose. The Teflon® liner in the hose prevents entry of air and moisture into the hose as well as providing a low friction surface on the inside of the hose.

Next, the mixture is forced from the output end 80 of pressure tube 76 into the input end 90 of hose 88 by the pressure created by pump 68. Hose 88 transports the mixture from its input end 90 to its discharge end 92. The material and structure of hose 88 allows it to prevent penetration of atmospheric moisture into the mixture, adhesion of the mixture to its internal surface, and radial swelling from the high pressure of the mixture. If the preferred embodiment is used, then the mixture flows out of the discharged end 92 of hose 88 and into the rigid tube 104 of spray handle 102. Pressurized air is then injected into the mixture by air injection conduit 100 to the spray nozzle 94. The pressurized air injected and nozzle atomizes the mixture and thus a substantially uniform spray pattern and thickness is applied to the desired application surface 96. In the preferred embodiment, an air valve 105 is positioned at the discharge end of the air line. The air valve 105 allows the amount of air delivered to the nozzle to be adjusted. In FIG. 10, the air valve is shown at the tip of the spray handle; however, those skilled in the art will recognize that the valve can be placed adjacent to the hand grip 200 for easy access by the operator. Generally, increasing the air flow creates a finer pattern, however, excessive air flow creates material bounce and faster nozzle wear. In addition, a steam emitter 204 can be attached to the spray handle 102. A steam line 206 is connected to the emitter 204 and to the exit of valve 208. The entrance of valve 208 is connected to steam delivery line 210. Steam delivery line 210 can be connected to a suitable source of steam. If desired a coupler 212 can be attached to the end of line 210 opposite the valve 208. In certain applications where a faster curing time is desired, application of steam is desirable to speed the rate of the curing process. Steam can be applied at the same time as the composition is being sprayed, can be applied after the composition has been sprayed, or both with the application of the composition and after application of the composition.

Finally, to enjoy the full range of benefits from the current invention, it is preferred that an appropriate formulation be used for the high viscosity mixture being spray applied such that the preferred characteristics are obtained. In particular, a proper balance should be struck when creating a silicone-aggregate mixture formulation to be applied. The primary consideration in formulating the mixture is that it is fluid enough to be processed and manipulated by the current invention, yet is still adherent to application surface 96 at a relatively uniform thickness. If the formulation is not appropriate, then the applied coating of silicone-aggregate mixture may not display the desired properties such as flame retardance, water resistance, and resistance to other forms of deterioration.

Any silicone rubber resin may be used. Most of the silicone rubbers are predominantly methyl polysiloxane, but may also contain other organic group substituents on the polymer chain such as phenyl or vinyl. A suitable rubber is a dimethyl polysiloxane having a molecular weight of about 40,000 to about 65,000. Flowable silicone can be used and it is preferred that a flowable silicone with a molecular weight in the range of from about 40,000 to about 44,000 be used. Non-flowable silicone can also be used and it is preferred that non-flowable silicone used in the invention have a molecular weight from about 43,500 to about 65,000. In the preferred embodiments, the silicone utilized is a mixture of flowable and non-flowable silicone. Room temperature vulcanizing (RTV) silicone may be used. The invention can be practiced using either non-flowable silicone, flowable silicone, or a mixture thereof.

It is preferred to use a one part RTV that is based on moisture condensation curing. The cure rate of these silicones can be increased by steaming the silicone when it is applied. The cross linking is caused by moisture in the air, addition of a catalyst, or a combination of both. Generally, in a 2 part silicone system, catalysts are used. Suitable catalysts include platinum and stannous soap. Vulcanization can be improved by the addition of vinyl groups. Organic peroxides can be used as vulcanizing agents. Solvents (diluents) which can be employed include aliphatic and aromatic hydrocarbons, including heptane, hexane, pentane, naphtha, toluene, xylene, mineral spirits, and chlorinated and fluorinated organic and inorganic solvents, or combinations thereof. The preferred solvent is mineral spirits. All solvents must be free of water. A desiccant can be employed.

It has been found that a viscosity of from about 900 cps to about 2000 cps for the liquid component is useful. This viscosity can be measured by a Brookfield Viscometer, with a 31 spindle at 3 rpm, and a sample size of 7 to 10 milliliters. The viscosity selected can vary with the conditions, for example a less viscous spray may produce the desired results on a flat roof while a more viscous spray is needed on a highly pitched roof or an overhead application. In overhead applications, a viscosity of from about 900 cps to about 6000 cps can be used. The viscosity can be adjusted by the operator for various conditions, composition of the spray, and time needed for cure. In overhead applications, it may be useful to apply steam to the freshly applied composition in order to speed the curing of the product.

The viscosity of the mixture is an important factor. Other factors to be considered in formulating are wettability, reaction time to dry, and volatility. The selection of silicone and solvent affect wettability. Thus, the solvent or silicone can be changed to meet the application requirements for each job.

In another embodiment, the present invention relates to a sprayable composition having about 0 to about 20 weight percent of filler, about 10 to about 48 weight percent of silicone, about 10 to about 49 weight percent of solvent, about 9 to about 90 weight percent of aggregate, about 0 to about 5 weight percent of desiccant, and about 0 to about 5 weight percent of pigment.

In another embodiment, the present invention relates to a sprayable composition with a high aggregate loading having about 0 to about 20 weight percent of filler, about 10 to about 25 weight percent of silicone, about 10 to about 20 weight percent of solvent, about 50 to about 90 weight percent of aggregate, about 0 to about 5 weight percent of desiccant, and about 0 to about 5 weight percent of pigment.

In another embodiment, the present invention relates to a sprayable condition with a low aggregate loading having about 0 to about 1 weight percent of filler, about 39 to about 48 weight percent of silicone, about 40 to about 49 weight percent of solvent, about 9 to about 12 weight percent of aggregate, about 0 to about 1 weight percent of desiccant, and about 0 to about 1 weight percent of pigment.

It has been found that a good general purpose spray composition can be made from:

(a) about 0 to about 20 weight percent of a density reducing agent such as ceramic microspheres or Zeospheres, (b) about 10 to about 25 weight percent of a silicone preferably an RTV silicone, (c) about 10 to about 20 weight percent of a solvent such as mineral spirits, (d) about 40 to about 90 weight percent of aggregate, (e) about 0 to about 5.0 weight percent of desiccant such as ethyltriacetoxysilane or methyltriacetoxysilane or combination of desiccants, (f) and 0 to about 1.0 weight percent of a catalyst, (g) about 0 to about 5 weight percent of a pigment, and (h) about 0 to about 0.5 weight percent of a dust suppressing agent such as poly dimethyl siloxane oil. Preferably the aggregate is finely divided to permit ease of flow and pumpability. Generally, the particle size of the aggregate should be below 850 microns and preferably 300 microns or larger.

It has also been found that another good general purpose spray composition can be made from:

(a) about 0 to about 20 weight percent of filler, such as a density reducing agent such as ceramic microspheres, glass bubbles, glass microspheres, plastic microspheres, zeeospheres, and combinations thereof;

(b) about 10 to about 48 weight percent of silicone, preferably being a room temperature vulcanizing (RTV) silicone;

(c) about 10 to about 49 weight percent of solvent, aliphatic and aromatic hydrocarbons, including heptane, hexane, pentane, naphtha, toluene, xylene, mineral spirits, chlorinated and fluorinated organic solvents, chlorinated and fluorinated inorganic solvents, mineral spirits, chlorinated and fluorinated organic solvents, chlorinated and fluorinated inorganic solvents, aliphatic hydrocarbons, aromatic hydrocarbons, and combinations thereof;

(d) about 9 to about 90 weight percent of aggregate, which is preferably finely divided to permit ease of flow and pumpability and which has a particle size from about 300 to about 850 microns;

(e) about 0 to about 5 weight percent of desiccant, such as ethyltriacetoxysilane, methyltriacetoxysilane, methyltriethoxysilane, and combinations thereof; and (f) about 0 to about 5 weight percent of pigment.

A preferred composition is:

(a) about 0 to about 20 weight percent of filler;

(b) about 10 to about 25 weight percent of silicone;

(c) about 10 to about 20 weight percent of solvent;

(d) about 50 to about 90 weight percent of aggregate;

(e) about 0 to about 5 weight percent of desiccant; and (f) about 0 to about 5 weight percent of pigment.

Another preferred composition is:

(a) about 0 to about 1 weight percent of filler;

(b) about 39 to about 48 weight percent of silicone;

(c) about 40 to about 49 weight percent of solvent;

(d) about 9 to about 12 weight percent of aggregate;

(e) about 0 to about 1 weight percent of desiccant; and (f) about 0 to about 1 weight percent of pigment.

Another preferred composition is:

(a) about 0.7 weight percent of filler;

(b) about 43.5 weight percent of silicone;

(c) about 44.7 weight percent of solvent;

(d) about 10.9 weight percent of aggregate;

(e) at most about 0.1 weight percent of desiccant; and (f) about 0.2 weight, percent of pigment.

And yet another preferred composition is:

(a) 0 to 20 weight percent of a filler, such as a density reducing material, (b) 10 to 23 weight percent of a RTV silicone, (c) 10 to 15 weight percent of a solvent, (d) 50 to 90 weight percent of an aggregate, (e) 0 to 5.0 weight percent of a desiccant, (f) 0 to 0.5 weight percent of a catalyst, and (g) 0 to 3 weight percent of a pigment.

Compositions which have been found useful in roofing applications are:

A. Grey color (a) 7.6% RTV 808 non-flowable silicone, (b) 7.6% RTV 110 flowable silicone, (c) 13.6% solvent, (d) 55.9% sand, (e) 13.9% Silicon dioxide, (f) 1.4% color, and (g) 1% desiccant by weight of silicon.

The above composition can be extended by the addition of from about 1 to about 7 percent by weight based on the weight of the above composition of a filler, that is a density reducing material, such as glass microspheres. It has been found that the addition of a small amount of microspheres reduces viscosity and makes the material flow more easily through the pump. The microspheres also reduce the weight of the applied film.

B. White color (a) 7.4% RTV 808 non-flowable silicone, (b) 7.4% RTV 110 flowable silicone, (c) 14% solvent, (d) 54.7% sand, (e) 13.7% Silicon dioxide, (f) 2.8% color, and (g) 1% desiccant by weight of silicon.

The above composition can be extended by the addition of from about 1 to about 7 percent by weight based on the weight of the above composition of a filler, that is a density reducing material, such as glass microspheres. It has been found that the addition of a small amount of microspheres reduces viscosity and makes the material flow more easily through the pump. The microspheres also reduce the weight of the applied film.

In another embodiment of the invention the composition has the formula:

(a) from 7 to 8 weight % of a non-flowable silicone;

(b) from 7 to 8 weight % of a flowable silicone;

(c) from 12 to 14.5 weight % solvent;

(d) from 50 to 58 weight % aggregate;

(e) 11 to 14 weight % silicon dioxide;

(f) from 0 to 3 weight % pigment; and (g) from 0 to 1% desiccant.

To this composition can be added from about 1 to 7 percent by weight based on the weight of the above composition of a filler, such as a density reducing material.

In preferred embodiments, the amount of desiccant is from about 1 to 1.5% of the total weight of the silicone in the composition. Suitable desiccants include methyltriethoxysilane (MTES)and ethyl triacetoxysilane. Also, in the preferred embodiment the silicone is a mixture of from 40 to 60% flowable silicone with 40 to 60% of non-flowable silicone. Flowable silicone has more silane that non-flowable silicone. Flowable silicone has shorter chain lengths than non-flowable and thus, flowable is of lesser viscosity than non-flowable and tends to be self leveling. Thus, the ratio can be adjusted to adjust the characteristics of the composition as desired for each individual project.

The filler, such as a density reducing agent can be any small particular size material, such as ceramic microspheres, glass microspheres, or perlite. Fillers that are density reducing agents allow a lighter weight film to be applied. Also, it has been found that the microspheres reduce the viscosity of the composition.

The filler may be comprised of material that is uniformly shaped, irregularly shaped, and combinations thereof. The filler may be comprised of material that is hollow, solid, and combinations thereof.

The filler may be a density reducing agent, such as material comprised of hollow spheres that are generally less dense than the aggregate. The filler may also be a density modifying agent, such as a material comprised of solid spheres, hollow microspheres, non spherical material, and combinations thereof, which have lower surface area to volume ratios and thereby permit increased volume loading capacity. Depending on the desired mechanical properties such as strength and density, either a solid filler or a hollow filler may be preferred over the other.

The filler material may be uniformly shaped as a sphere that permits material particles to more easily roll over one another, thereby improving flow characteristics, viscosity properties, pumpability, sprayability, and proccessability. Furthermore, filler materials that are uniformly shaped as a sphere occupy more space than an equal weight of typical mineral filler and aggregates, thereby increasing cost effectiveness on a cost per unit volume basis.

The filler material may also be made of material with increased strength and increased strength-to-weight ratios for improved durability and processing survival of the silicone-aggregate mixture. Furthermore, the filler may help improve other properties of the silicone-aggregate mixture, including hardness, corrosion resistance, and abrasion resistance.

The aggregate used in the invention can be any aggregate which will be bound and held by silicone. Preferably the aggregate used has a particle size from about 300 to about 850. Suitable aggregates include silicon dioxide, sand, crushed rock, fly ash, stone dust, amorphorous silicon dioxide. A combination of aggregates may be used. If stone dust is used, it preferably is not used for more than 50% of the aggregate. The pigments useful are any of the known pigments for supplying color and which are compatible with the silicone and solvents. Suitable pigments include silicone pastes and titanium dioxide. The desiccant used can be any desiccant which is compatible with the silicone and the solvents. In certain situations, such as overhead applications, it may be desirable to apply steam to the composition or to use a composition which includes a catalyst.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

That which is claimed is:

1. A composition comprising:

(a) about 1 to about 7 weight percent of a flow enhancing filler;

(b) about 10 to about 25 weight percent of silicone;

(c) about 10 to about 20 weight percent of solvent;

(d) about 50 to about 70 weight percent of aggregate;

(e) about 0 to about 5 weight percent of desiccant; and (f) about 0 to about 5 weight percent of pigment.

2. A composition of claim 1 wherein said aggregate comprises a material selected from the group consisting of silicon dioxide, sand, crushed rock, fly ash, stone dust, amorphous silicon dioxide, ground silica, silica sand, quartz, crystalline silica, and combinations thereof.

3. A composition of claim 1 wherein said flow enhancing filler is selected from the group consisting of ceramic microspheres, glass bubbles, glass microspheres, plastic microspheres, zeospheres, and combinations thereof.

4. A composition of claim 1 wherein said silicone is selected from the group consisting of non flowable silicone, flowable silicone, and combinations thereof.

5. A composition comprising:

(a) about 1 to about 7 weight percent of a flow enhancing filler;

(b) about 10 to about 48 weight percent of silicone mixture being (i) about 4 to about 29 weight percent of the composition of flowable silicone; and (ii) about 4 to about 29 weight percent of the composition of non-flowable silicone;

(c) about 10 to about 49 weight percent of solvent;

(d) about 9 to about 70 weight percent of aggregate;

(e) about 0 to about 5 weight percent of desiccant; and (f) about 0 to about 5 weight percent of pigment.

6. A composition of claim 5 wherein said flow enhancing filler is selected from the group consisting of ceramic microspheres, glass bubbles, glass microspheres, plastic microspheres, zeospheres, and combinations thereof.

7. A composition of claim 5 wherein said non-flowable silicone has a molecular weight from 43,500 to 65,000 and said flowable silicone has a molecular weight from 40,000 to 44,000.

8. A composition of claim 5 wherein the desiccant is selected from the group consisting of ethyltriacetoxysilane, methyltriacetoxysilane, methyltriethoxysilane, and combinations thereof.

9. A composition of claim 6 wherein said non-flowable silicone has a molecular weight from 43,500 to 65,000 and said flowable silicone has a molecular weight from 40,000 to 44,000.

10. A composition of claim 5 wherein the solvent is selected from the group consisting of heptane, hexane, pentane, naphtha, toluene, xylene, mineral spirits, chlorinated and fluorinated organic solvents, chlorinated and fluorinated inorganic solvents, aliphatic hydrocarbons, aromatic hydrocarbons, and combinations thereof.

11. A composition comprising:

(a) base mixture having, (i) about 7 to about 8 weight percent of said base mixture of flowable silicone;

(ii) about 7 to about 8 weight percent of said base mixture of non-flowable silicone (iii) about 12 to about 14.5 weight percent of said base mixture of solvent;

(iv) about 61 to about 72 weight percent of said base mixture of aggregate;

(v) about 0 to about 1 weight percent of said base mixture of desiccant;

(vi) about 0 to about 3 weight percent of said base mixture of pigment; and (b) about 1 to about 7 weight percent based on the weight of said base mixture of a flow enhancing filler.

12. A composition of claim 11 wherein said aggregate comprises a material selected from the group consisting of silicon dioxide, sand, crushed rock, fly ash, stone dust, amorphous silicon dioxide, ground silica, silica sand, quartz, crystalline silica, and combinations thereof.

13. A composition of claim 11 wherein said flow enhancing filler is selected from the group consisting of ceramic microspheres, glass bubbles, glass microspheres, plastic microspheres, zeospheres, and combinations thereof.

14. A composition of claim 12 wherein said flow enhancing filler is selected from the group consisting of ceramic microspheres, glass bubbles, glass microspheres, plastic microspheres, zeospheres, and combinations thereof.

* * * * *

UNITED STATES PATENT AND TRADEMARK OFFICE

CERTIFICATE OF CORRECTION

PATENT NO. : 6,399,678 B2
DATED : June 4, 2002
INVENTOR(S) : Stanley Peter Frankoski et al.

It is certified that error appears in the above-identified patent and that said Letters Patent is hereby corrected as shown below:

Title page,
Item [57], ABSTRACT,
delete "A composition of matter, apparatus, and method relating to silicone-aggregate mixtures for pumping and spraying applications. Such mixtures include a solvent, a silicone or mixtures of silicones, a flow enhancing filler and aggregates."

and insert -- A composition of matter, apparatus, and method relating to silicone-aggregate mixtures for pumping and spraying applications. In preferred embodiments, the apparatus and method can include a metering mechanism for dispensing the mixture to the pump, an agitator for mixing the mixture before it enters the pump, and a spray nozzle for applying the mixture exiting the hose. Even more preferred embodiments can include a metering mechanism in the form of a variable speed auger screw, a hose internally lined with a coating of polytetrafluoroethylene, a hose structurally reinforced, and a pump and hose that are individually sealable. --.

Signed and Sealed this

Fifth Day of August, 2003

JAMES E. ROGAN
*Director of the United States Patent and Trademark Office*